Figure 1:
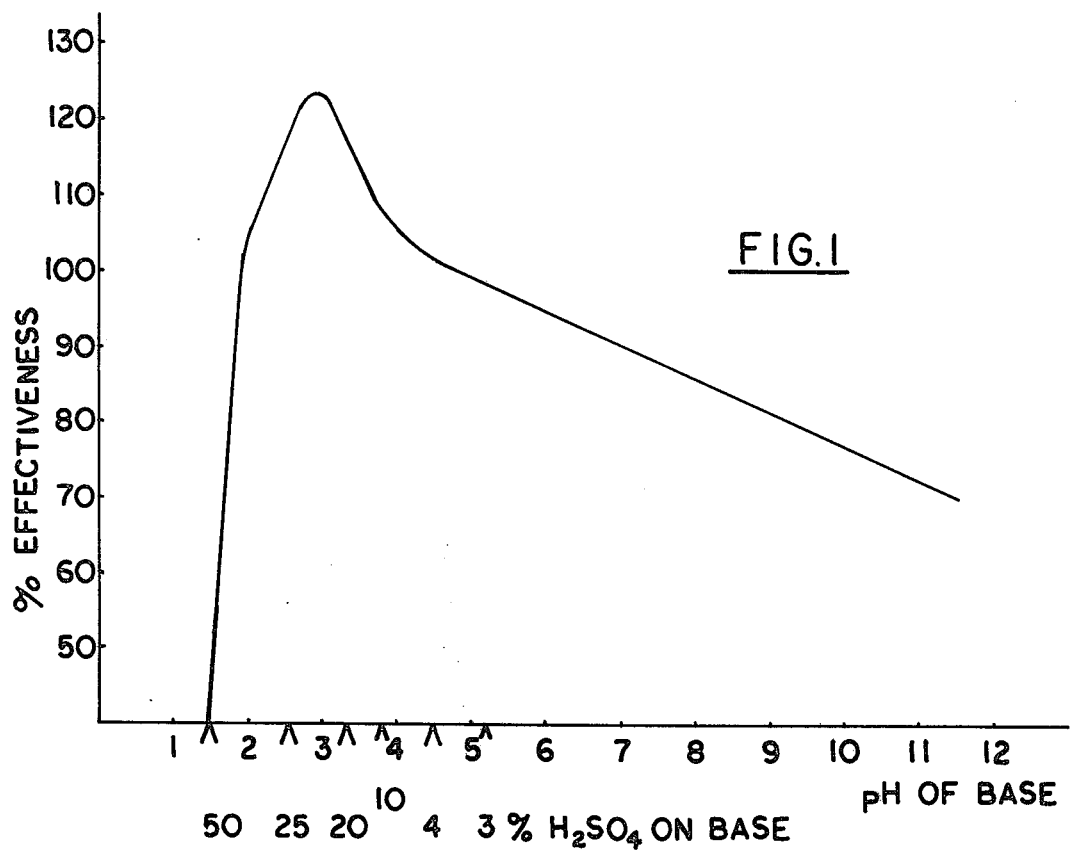

United States Patent [19]

Davis

[11] 4,008,173
[45] Feb. 15, 1977

[54] DEFOAMER COMPOSITION

[75] Inventor: Stephen A. Davis, Philadelphia, Pa.

[73] Assignee: Philadelphia Quartz Company, Valley Forge, Pa.

[22] Filed: Apr. 21, 1975

[21] Appl. No.: 569,736

Related U.S. Application Data

[63] Continuation of Ser. No. 289,712, Sept. 15, 1972, abandoned.

[52] U.S. Cl. .............................. 252/358; 252/321
[51] Int. Cl.$^2$ ....................................... B01D 19/04
[58] Field of Search ........................... 252/358, 321

[56] References Cited

UNITED STATES PATENTS

| 3,235,509 | 2/1966 | Nitzsche et al. | 252/358 |
| 3,573,222 | 3/1971 | Harrison et al. | 252/358 |

Primary Examiner—Benjamin R. Padgett
Assistant Examiner—David Leland
Attorney, Agent, or Firm—Fred Philpitt

[57] ABSTRACT

A composition containing finely divided synthetic, precipitated amorphous metal-silicate and an acid; said composition having a pH of 2 to 5 being suitable for use as a base for defoamers for aqueous systems.

9 Claims, 2 Drawing Figures

DEFOAMER COMPOSITION

This is a continuation of application Ser. No. 289,712, filed Sept. 15, 1972, now abandoned.

PRIOR ART

It is well known that finely divided solids are useful additives in defoamer compositions. Silicones are also known to be exceptionally active defoamers for aqueous systems and it is known that the required amount of the more expensive silicone may be reduced if the silicones are firmly attached to the surface of a finely divided solid. This attachment appears to be brought about by direct reaction of a silane with surface hydroxyl groups or a catalytic reaction between a siloxane and surface hydroxyl groups of the solid.

In addition it is recognized that silica and siliceous bases generally are particularly effective in adsorbing silicone fluids and maintaining them in the interface where they act to reduce foaming. The methods of attaching the silicones in the form of silanes and/or siloxanes for instance are also well known. It has been found, as shown in U.S. Pat. No. 3,207,698 (Feb. 21, 1965), Liebling et. al., that these hydrophilic bases form improved defoamer additives if the pH is raised above the pH normal to the particular product. Thus if the base is raised to a pH between 8 and 10, it is better than a silica which has a neutral or even an acidic pH and it does not require the addition of a surfactant. If the pH is further raised to the range of 11 to 12, then the hydrophobic silica formed from such an alkalized hydrophilic base peaks at an even higher level as an additive for a defoamer composition comprising a suspension or an emulsion of the hydrophobic base with hydrophobic organic liquid.

It has also been shown in U.S. Pat. No. 3,573,222 (Mar. 30, 1971) Harrison et. al., that finely divided synthetic alumino-silicates (often referred to as silicoaluminates) make good defoamer additives when treated with silanes, even though the silanes leave a residue. They are improved by addition of caustic. The prior and synthetic alumino-silicates are cheaper than the finely divided silicas used for this purpose making them economically attractive as defoamers even though they are less active.

As noted above, when the pH of a precipitated or synthetic finely divided amorphous alumino-silicate is raised by addition of alkali, the defoaming activity of the hydrophobic product may be increased to approach the activity of the alkaline silica products. Most surprisingly, and contrary to prior art teaching, I have found that if the pH of these alumino-silicates is strongly reduced, rather than being raised, the acidic hydrophobic products of the reaction with silicones are even better than the most alkaline silica products when used as a defoamer base for aqueous systems. Thus I find that if the alumino-silicates with a normal pH of about 7 to 10 are combined with 3 to 40% of acid based on the weight of the alumino-silicate and have their pH sharply reduced to a pH of from below about 5 to about 1.8, the completely hydrophobic products made therefrom will have defoaming efficiencies of 100% or more compared to the hydrophobic additives made from highly alkalized silicas used as controls. The normal untreated alumino-silicates having a high pH will have a comparative efficiency at the same coating level of only 70 – 80%. When the pH is reduced to a range of about 4.0 to 1.8 or, preferably, 2 to 3.5, the efficiency may be of the order of 110 to 120% compared to hydrophobic additives made from alkalized silica base.

The preparation of such synthetic alumino-silicates is described in U.S. Pat. No. 3,573,222 and said patent as well as U.S. Pat. No. 3,207,698, referred to above, are included herein by reference. These references describe the procedures for preparing hydrophobic materials from hydrophilic bases and also the preparation and testing of defoamers — especially those for aqueous systems. In addition to alumino silicates, it would be possible to use other metal silicates including magnesium, calcium, and sodium-aluminum silicates.

In lowering the pH of the base, any form of recognized acid treatment, by which the base is uniformly treated, can be followed. I have found that the addition of an aqueous acid solution to the synthetic alumino-silicate can produce a base material having the desired pH of below about 5 and down to 1.8. This hydrophilic material can then be treated with silicone (a silane or siloxane) to produce a hydrophobic material. This latter treatment step can be accomplished by the methods of the aforementioned patents. Suitable siloxanes include organic liquid polysiloxanes selected from the group consisting of alkyl polysiloxanes, aryl polysiloxanes, arylalkyl polysiloxanes, and alicyclic polysiloxanes having a viscosity of about 10 to 3000 centistokes. For the acid treatment, I prefer to use sulfuric and hydrochloric acids, however, other mono and di-protic acids, such as acetic and sulfurous, can be used providing that the required pH range is achieved. In each case the other properties of the acid need to be taken into consideration. For instance, if sulfuric acid is too concentrated, it will not penetrate and activate the surface. It is also too catalytic with silicone oil. Therefore, sulfuric acid should be used in a concentration not over 65%. On the other hand, if too much water is added, the composition is too wet and the sulfuric acid is too dilute to react well. Thus, I use sulfuric acid having a concentration of about 20 to 65% and I prefer the range of 50 to 60%. From 3 to 40% of 100% $H_2SO_4$, on weight of base material, is required to produce a pH in a range of 1.8 to 5.0, depending of course on the initial pH and the final pH achieved. With a base having an initial pH of 10, I have used 25% of $H_2SO_4$ based on the weight of the alumino-silicate to produce a material having a pH of about 2.5 whereas 38% is required to obtain a pH of about 1.9 and 50% for a pH of 1.4. Only 3% $H_2SO_4$ is required for a pH of about 5.0. Hydrochloric acid may also be used and I find that for the same pH 10 base, 11% of HCl will give a material having a pH of 3.0. (This is used as a commercial 38% solution). Phosphoric acid has a surface effect which prevents the proper reaction of the silicone with the alumino-silicate and therefore it should not be used. Strongly oxidizing acids also react with the silicone and break down the polymer.

The particle size of the finely divided base material should be 10 to about 200 millimicrons and preferably between about 20 and 100 millimicrons. I find that the hydrophilic base with acid treatment and having an effective amount of silicone coated thereon increases the defoaming ability up to about 20% over the untreated base. The amount of silicone required can vary between about 2 and 30% on a weight basis and will depend on the particle size and active surface area of the alumino-silicate. For those silicates with lower surface areas, 5 to 15% of the silicone is generally satisfactory, while those with higher surface areas may require up to 25% silicone in order to develop the performance of over 100% relative to the control — a highly effective commercial defoamer additive. While I prefer to use dimethyl polysiloxanes as shown in the examples, a methyl — hydrogen polysiloxane may be used if it provides methyl groups equivalent to, or greater than, the dimethyl siloxane coating. The required treatments are well known and some are shown in the following examples as well as in the patents previously referred to.

The base material described above is generally added to a water insoluble organic liquid to form the defoaming composition. The base material can be present in an amount of 3 to 30% on a weight basis and the organic liquid can be present in amount of 70 to 97% on a weight basis. The organic liquid can be selected from the group consisting of aliphatic hydrocarbons, alicyclic hydrocarbons, aromatic hydrocarbons, and mixtures thereof. Suitable liquids and desired parameters are disclosed in U.S. Pat. No. 3,207,698.

In preparing the final defoamer composition, it is also useful to add up to about 1% of finely divided silica, such as CAB-O-SIL, a fumed silica aerogel sold by Cabot Corporation, or QUSO G 32, a precipitated silica sold by the Philadelphia Quartz Company, or a Bentone such as Bentone 34, a hydrophobic base exchange clay, sold by National Lead Company, or ZEOTHIX 95 sold by J. M. Huber Company. These additives control the viscosity of the hydrophobic organic liquid dispersion and prevent settling of the hydrophobic solid.

While any finely divided amorphous alumino-silicate may be used, I generally prefer precipitated amorphous alumino-silicates which have a composition and characteristics found in the range given in Table I.

TABLE I

Acceptable range given in column 1, preferred in column 2)

TABLE I

| Acceptable range given in column 1, preferred in column 2) | | |
|---|---|---|
| | 1 | 2 |
| $Na_2O$ % | 4 – 8 | 5 – 7 |
| $Al_2O_3$ % | 9 – 15 | 11 – 13 |
| $SiO_2$ % | 65 – 75 | 67 – 71 |
| Loss at 105° C % | 7 – 12 | 8 – 11 |
| Refractive Index | 1.51 – 1.55 | 1.53 – 1.55 |
| pH (20 gms in 100 ml) | 6.5 – 10.5 | 9.5 – 10.5 |
| Particle diameter (m$\mu$) | 15 – 75 | 30 – 50 |
| Bulk density lb./ft.$^3$ | 16 – 37 | 16 – 18 |
| Area m$^2$/g (BET) | 35 – 130 | 60 – 75 |
| Oil Absorption gm/100 gm | 60 – 135 | 105 – 125 |
| Aggregate Size (% below 5$\mu$) | 59 – 84 | 59 – 84 |

Figure 2:
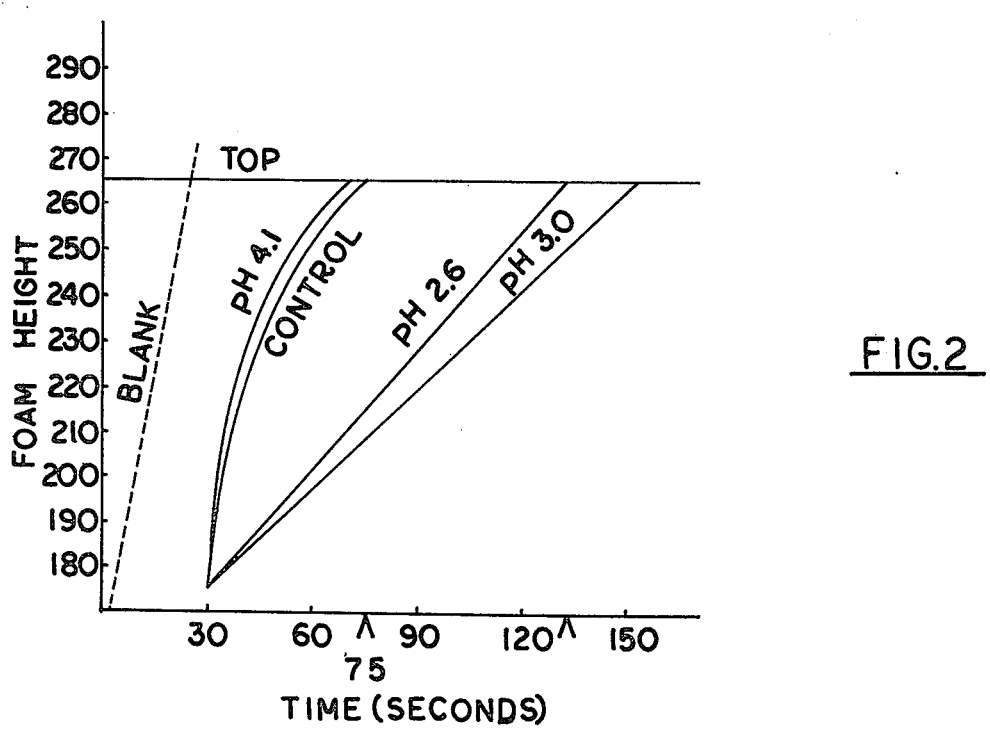

While I have usually mentioned the pH as the pH of the treated or adjusted hydrophilic base and find that this pH range should be between about 1.8 and 5, the comparable pH of the final hydrophobic additive should be between about 2 and 5.5. I prefer to employ the ranges of 2 to 3.5 for the hydrophilic base and 2.5 to 4 for the hydrophobic product. FIG. 1 shows the effect of pH of the hydrophilic base on the defoaming efficiency when using 10% of a dimethyl polysiloxane coating and when compared with a silica recognized as one of the best prior art coated silicas as the control (i.e., 100% efficiency). FIG. 2 shows that when my preferred additives are employed, 2 to 3 times as long is required to reach the maximum foam height compared to the control alkalized silica of the prior art. The foam height units are arbitrary and used only for comparative purposes.

The following examples are intended only to illustrate the operation of the process of the present invention and are in no way intended to limit the scope of the process or the products of the invention.

Amounts are given in parts by weight (pbw) unless otherwise stated.

The characteristics of the defoamer are evaluated by the percent efficiency (PE) based on the foam produced at the end of 60 seconds of a two minute foam generating process.

Percent efficiency (PE) is found from the relation $$PE = \frac{FHb - FHx \times 100}{FHb - FHc}$$

where
$FHb$ is the foam height in arbitrary units of blank (no defoamer added) test at 60 seconds
$FHc$ is the foam height in arbitrary units of control test at 60 seconds.
$FHx$ is the foam height in arbitrary units of sample test at 60 seconds.

EXAMPLE 1

The effect of pH of the alumino-silicate base and sulfuric acid content on defoamer efficiency is shown in FIG. 1. In this series, the base was prepared by treating 100 pbw of a sodium alumino-silicate having the following properties:

| | |
|---|---|
| $Na_2O$,% | 8.0 |
| $SiO_2$,% | 64.6 |
| $Al_2O_3$,% | 10.0 |
| MgO,% | 0.04 |
| $R_2O_3$ ($Fe_2O_3$),% | 0.6 |
| $Na_2SO_4$,% | 2.3 |
| Loss Ignition, % | 15.5 |
| "(on heating at 105° C) % | 7.2 |
| pH | 10.0 |
| Refractive Index | 1.55 |
| Particle Diameter, m$\mu$ | 45 |
| Area, m$^2$/g | 42 |
| Oil Absorption (g/100g) | 105 – 125 |
| Bulk Density (lbs./ft.$^3$) | 19 – 22 |
| Sieve Residue (−325M) % | 0.1 |
| Aggregates below 5$\mu$, % | 74 | with 41.6 pbw of sulfuric acid solution (60 pbw $H_2SO_4$ and 40 pbw $H_2O$); two pbw of this treated alumino-silicate was dispersed in 80 pbw of water to determine the pH of the base as shown in FIG. 1.

Next, 100 parts by weight of the pH adjusted alumino-silicate was coated with 10 parts by weight of a dimethyl polysiloxane and heated in an oven at 600° F (316° C) for 16 hours. This formed the hydrophobic material with the silicone tightly bound to the base. Then 10 parts by weight of the hydrophobic alumino-silicate was intimately mixed by ball milling with 90 parts by weight of a mineral seal oil having an API gravity of 26.7. Five parts by weight of this mixture was added to 6 × 10$^5$ (600,000) pbw of a representative black liquor from a paper company, heated to 90° C. This mixture was mixed vigorously for two minutes and the dynamic foam height was observed at given times within the two minutes. This data is shown in FIG. 2. The percent efficiency was calculated with respect to a defoamer made with a control hydrophobic silica which is recognized by industry as among the best defoaming silicas available as a commercial defoamer additive. As is evident from FIG. 1, the range in which my defoamers are equivalent to the control composition is from about 1.8 to about 5.5.

In FIG. 2, with the pH range between 2.5 to 3 for the hydrophilic base, it takes from 130 to 150 seconds to generate a specific amount of foam compared to less than 75 seconds for the control composition.

The unadjusted alumino-silicate with a base pH of 10 had a PE of 50%.

Table II gives the test values obtained as the pH was varied. Some of this information is also plotted in FIG. 2.

TABLE II

| Adjusted Base pH | Percent Efficiency |
| --- | --- |
| 1.4 | 0 |
| 1.9 | 105 |
| 2.5 | 110 |
| 2.5 | 110 |
| 2.6 | 120 |
| 3.0 | 120 |
| 3.1 | 105 |
| 3.4 | 110 |
| 4.5 | 100 |
| 5.5 | 100 |
| 6.1 | 60 |
| 7.4 | 90 |
| 8.0 | 90 |
| 8.5 | 85 |
| 10.7 | 75 |
| 11.5 | 70 |

Table III was established with a base pH of 2.5 showing the effect of increasing amounts of silicone coating:

TABLE III

| Dimethyl Polysiloxane Oil | PE |
| --- | --- |
| 2.5% | 0 |
| 5.0% | 100% |
| 7.5% | 105% |
| 10 | 110% |
| 12.5 | 110% |
| 15 | 110% |
| 20 | 110% |

In addition, I found that the sodium alumino-silicate could be improved in some cases by air milling to break down any aggregate structure.

EXAMPLE 2

When hydrochloric acid was used instead of the sulfuric acid of Example 1, the pH of the hydrophilic base was 3.0 and the defoaming efficiency (PE) obtained was 100% compared to 120% for the same amount of sulfuric acid.

EXAMPLE 3

Sodium alumino-silicate was treated as before with sulfuric acid giving a hydrophilic base pH of 3.4. When this was coated with hydrogen methyl siloxane using a 10% coating, defoaming was unsatisfactory after maintaining the system at room temperature for four months. Thereafter, when the coating level was raised to 20% and held for three days at room temperature, the defoaming efficiency (PE) was increased to 85%. This demonstrates the importance of having sufficient methyl groups on the surface of the substrate. The effectiveness of the hydrogen methyl siloxane also increased by heating for 16 hours at 155° C. Thus, with a substrate having a pH of 2.5, a 10% coating heated as indicated, had a defoaming efficiency (PE) of 100%. Again, increasing the coating to 20% gave a much better performance showing 115% defoaming efficiency (PE).

EXAMPLE 4

In another test, sodium alumino-silicate was treated with sulfuric acid using 6.5 parts by weight of 60% sulfuric acid with 15 parts by weight of the sodium alumino-silicate mixed in a P-K blender. The sulfuric acid solution was added through the intensifier bar in about seven minutes. The pH of the uncoated product was 3.3.

Following this, 1.5 parts by weight of L-45 silicone fluid were added to the mixture through the same intensifier bar in a period of about nine minutes. The density of the product in the blender was 12 pounds per cubic foot. This product was then cured in a 55 gallon drum for 20 hours at 600° F (316° C).

When tested as before, this product had a defoaming efficiency of 110%.

EXAMPLE 5

The effect of curing under different conditions was studied. The alumino-silicate of Example 1 was adjusted to pH 3.4 with sulfuric acid, coated as in Example 1 and then divided into two parts. One part was cured at 600° F (316° C) for 20 hours in a layer two inches deep. The second part was cured in an agitated vessel at 460° F (238° C) for four hours. The defoamer compositions were then prepared as before with a PE in the first case of 120% and 115% in the second case.

EXAMPLE 6

In this example the sodium silico-aluminate had the following properties:

| | |
| --- | --- |
| Na$_2$O % | 6.8 |
| SiO$_2$ % | 64.2 |
| Al$_2$O$_3$ % | 10.5 |
| MgO | 0.02 |
| Na$_2$SO$_4$ % | 2.3 |
| Ignited Loss | 17.2 |
| Loss at 105° C | 8.2 |
| Particle size, m$\mu$ | 22 |
| Surface Area (BET), m$^2$/g | 66.9 |
| Refractive Index | 1.51 |
| Specific Gravity | 2.1 |
| pH | 7.0 |
| Oil Absorption (g/100g) | 120 |
| Aggregates below 5 $\mu$, % | 84 |

This amorphous silico-aluminate was coated, as before, with dimethyl polysiloxane (Union Carbide L-45) and heated for 20 hours at 300° C. Based upon interim samples taken, the length of time for heating does not appear to have much effect on the product after five hours. All products were 100% hydrophobic. From these results (Table IV), it can be seen that the higher surface area required an increased proportion of siloxane in order to get complete defoaming activity:

TABLE IV

| % Acid | PH | % Dimethyl Polysiloxane | PE |
| --- | --- | --- | --- |
| 0 | 7.9 | 15 | 105 |
| 0 | 7.4 | 20 | 105 |
| 6.25 | 4.5 | 10 | 100 |
| 12.5 | 4.0 | 10 | 80 |
| 15.0 | 3.8 | 12 | 105 |
| 15 | 3.8 | 15 | 105 |
| 25 | 3.0 | 10 | 90 |

TABLE IV-continued

| % Acid | PH | % Dimethyl Polysiloxane | PE |
|--------|-----|-------------------------|-----|
| 23 | 2.7 | 20 | 110 |

EXAMPLE 7

In this example an amorphous sodium alumino-silicate having the following properties was used:

| | |
|---|---|
| $Na_2O$ % | 8.0 |
| $SiO_2$ % | 64.6 |
| $Al_2O_3$ % | 10.0 |
| MgO | 0.04 |
| Sodium Sulfate % | 2.8 |
| Ignited Loss % | 15.5 |
| Loss at 105° C | 8 % |
| Particle size, m$\mu$ | 72 |
| Surface Area (BET) m²/g | 35 |
| Refractive Index | 1.55 |
| Specific Gravity | 2.3 |
| pH | 10.5 |
| Oil Absorption (g/100g) | 70 |
| Aggregates below 5 $\mu$, % | 59 |

This product was coated with 10% L-45 and heated for 20 hours at 300° C and had a PE of 40%.

When this product was treated with 22.5% of $H_2SO_4$ (as a 60% solution), the pH of the composition was 2.7. This composition was then coated with 10% of L-45 and heated as before. It had a PE of 100%. The product was 100% hydrophobic.

Thus, I have discovered that exceptionally active defoamer compositions may be obtained by forming a suspension and/or an emulsion with a hydrophobic organic liquid and a synthetic precipitated amorphous alumino-silicate in the particle size range of below about 200 mu and preferably between 20 and 100mu and having a pH between about 5.0 and 1.8 and preferably between about 2 and 3.5, hydrophobized with a coating of a silicone preferably from the group consisting of a silane, a dimethyl polysiloxane, and a hydrogen-methyl polysiloxane reacted to the surface thereof. These defoamer compositions are especially suitable for aqueous systems such as black liquors encountered in the production of paper. The synthetic precipitated amorphous alumino-silicate can be present in the suspension or emulsion.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well known doctrine of equivalents, as well as changed proportions of the ingredients which do not render the compositon unsuitable for the disclosed purposes. Therefore, this application for Letters Patent is intended to cover all such modifications, changes and substitutions as would reasonably fall within the scope of the appended claims.

What I claim is:

1. A hydrophobic defoamer base suitable for preparing defoamers for aqueous systems, having a pH of 2 to 5.5 consisting of an amorphous, precipitated hydrophilic metal silicate having a particle size of 10 to 200 mu, the pH of said silicate being adjusted to a value of 1.8 to 5.0 by acid addition and being selected from the group consisting of aluminum silicate (alumino silicate), magnesium silicate, calcium silicate and sodium aluminum silicate (sodium alumino silicate) said hydrophilic metal silicate being rendered hydrophobic by coating with 2 to 30% of an organosiloxane having a viscosity of 10 to 3000 centistokes and heating said coated silicate at a temperature between 230° and 320° C for 4 to 20 hours.

2. The defoamer base of claim 1 wherein the pH of the hydrophobic metal silicate is adjusted to 1.8 to 4.0.

3. The defoamer base of claim 1 with a pH of 2.5 to 4.0 wherein the pH of the hydrophilic metal silicate is adjusted to 3 to 3.5.

4. The defoamer of claim 1 wherein the siloxane is selected from the group consisting of alkyl polysiloxanes, aryl polysiloxanes, arylalkyl polysiloxanes and alicyclic polysiloxanes.

5. The defoamer base of claim 1 wherein the siloxane is selected from the group consisting of dimethyl polysiloxane and methyl hydrogen polysiloxanes.

6. The defoamer base of claim 1 wherein the heating is carried out at a temperature between 238° and 316° C.

7. The defoamer base of claim 1 wherein the pH of the hydrophilic metal silicate is adjusted using an acid selected from the group consisting of sulfuric, hydrochloric, acetic and sulfurous.

8. The defoamer base of claim 1 wherein the acid is sulfuric and the equivalent of 3 to 40% of 100% $H_2SO_4$ based on the weight of said metal silicate is used as a 20 to 65% solution of $H_2SO_4$ to adjust the pH of the hydrophilic silicate.

9. The defoamer base of claim 8 wherein the sulfuric acid has a concentration of 50 to 60%.

* * * * *